United States Patent Office 3,551,480
Patented Dec. 29, 1970

3,551,480
PROCESS FOR THE MANUFACTURE OF CRYSTALLIZABLE PHOSPHONIC ACIDS
Hans-Günther Germscheid, Hosel, and Joachim Schiefer, Opladen-Lutzenkirchen, Germany, assignors to Henkel & Cie GmbH, Dusseldorf, Germany
No Drawing. Continuation-in-part of application Ser. No. 446,721, Apr. 8, 1965, which is a continuation-in-part of application Ser. No. 159,158, Dec. 13, 1961. This application Feb. 2, 1967, Ser. No. 613,415
Claims priority, application Germany, July 3, 1961, H 43,034, Patent 1,148,551
Int. Cl. C07f 9/28; C11d 1/02, 3/36
U.S. Cl. 260—501.19
10 Claims

ABSTRACT OF THE DISCLOSURE

A process for the manufacture of phosphonic acids having at least two phosphorus atoms in their molecules which are crystallizable. They are produced by the reaction of phosphorous acid with anhydrides or chlorides of aliphatic acids having 2 to 12 carbon atoms or mixtures thereof, or by reacting $PCl_3$ with aliphatic acid having 2 to 12 carbon atoms; followed by a hydrolysis at elevated temperatures.

CROSS-REFERENCES TO RELATED APPLICATIONS

This application is a continuation-in-part of our copending application Ser. No. 446,721, filed Apr. 8, 1965, now abandoned, which, in turn, is a continuation-in-part of our application Ser. No. 159,158, filed Dec. 13, 1961, and now abandoned.

BACKGROUND OF THE INVENTION

Processes are known for the production of phosphonic acids having two phosphorus atoms in their molecules. For instance, phosphorous acid can be reacted with acetyl chloride or with acetic acid anhydride.

DESCRIPTION OF PRIOR ART

In all processes hitherto known, mixtures of different substances frequently are obtained. Details of the constitution of these different products have not been fully ascertained. However, chromatographic investigations have shown that, in part, rather complicated mixtures are present. In order to obtain uniform products, comparatively difficult recrystallization procedures have to be followed. Many of these products also do not crystallize, but, when isolated, are present in the form of oils. When these products are converted into their corresponding salts and subjected to spray-drying, hygroscopic materials generally are obtained.

SUMMARY OF THE INVENTION

It now has been found that products of uniform constitution can be manufactured by the process according to the invention which crystallize well and are practically non-hygroscopic.

These products are obtained in the following manner:
Phosphorous acid is reacted with anhydrides or chlorides of aliphatic carboxylic acids having 2 to 12 carbon atoms in their molecule, or with mixtures of these anhydrides and chlorides, at temperatures of 80–200° C. It also is feasible to use $PCl_3$ and the corresponding aliphatic carboxylic acids. After the completion of this reaction, a hydrolysis is carried out with water at temperatures above 60° C. The "completion of the reaction" of phosphorous acid with acid chlorides and/or anhydrides as named is to be understood as the time at which no further decrease of phosphorous acid can be measured or, when, by suitable choice of the starting materials, substantially the entire phosphorous acid present has reacted.

The hydrolysis with water is carried out at temperatures ranging from 60 to 200° C. within substantially 4 minutes to 6 hours. The time during which the water acts depends upon the temperature, lower temperatures requiring longer time, higher temperatures shorter times. The water may be introduced as a liquid or condensed by the introduction of steam. At temperatures of 140° C. it is not necessary to work under pressure because up to this temperature sufficient water condenses in the reaction mixture. If temperatures above 140° C. are employed, decomposition might occur, and it is advantageous to carry out the hydrolysis in a closed vessel at ambient pressures.

An advantageous embodiment of carrying out the process according to the invention consists of adding a small quantity of water to the reaction mixture after completion of the first step, followed by heating of the mixture by introducing steam therein and holding it at the desired temperature for the proper length of time.

Chromatographic investigations have shown that the simple process described above yields practically fully uniform materials having the following Formula 1

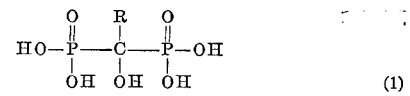
(1)

wherein R is an alkyl radical having 1 to 11 carbon atoms.

The products obtained in the process according to the invention and the salts of these acid products respectively, usually are crystalline. The conversion of the acids obtained into the corresponding alkali ammonium and alkanolamine salts is readily accomplished by neutralization with alkali, ammonium or alkanolamine hydroxides in water or in alcohol. The salts thus formed yield compounds which are stable on storage and non-hygroscopic and can be obtained by recrystallization from concentrated solutions, spray-drying, or precipitation with organic solvents, such as alcohol or acetone.

The phosphonic acids producible according to the above described process, containing longer carbon chain radicals, have surface-active properties, and, hence, are suited for use as cleansers and detergents. Those phosphonic acids containing a short carbon chain are good complex formers with polyvalent cations and are, even in very small concentrations, preventives against calcification in hard water.

DESCRIPTION OF THE PREFERRED EMBODIMENTS

The invention now will be further explained by the following examples. However, it should be understood that these are given merely by way of illustration, not of limitation, and that changes may be made in the details without departing from the spirit and the scope of the invention as hereinafter claimed.

All parts and percentages given in the examples are by weight, unless otherwise specified.

Example 1

2 mols phosphorous acid were heated with 2.2 mols acetic anhydride at 120° C. for 1.5 hours with agitation. In order to determine whether the reaction was complete, the phosphorous acid content was measured titrimetrically in a sample of the reaction mixture by oxidation with an iodine solution in bicarbonate-alkaline range. Since the phosphorous acid content was less than 0.1 percent, the reaction was completed. The syrupy reaction mixture could not be caused to crystallize. 200 ml. water now were introduced, and the aqueous solution held at 60° C. for 5 hours. The pH then was adjusted to 8 by addition of 50% aqueous NaOH, the mixture allowed to cool, whereby the salt crystallized and was filtered by suction. The yield was 305 g. sodium salt containing water of crystallization, having a phosphorus content of 18.03% or 88.7% of the theory, calculated on the amount of phosphorus employed.

Any desired alkali metal hydroxide may be used in lieu of NaOH.

Example 2

1 mol phosphorous acid and a mixture of 0.7 mol acetic anhydride and 0.8 mol acetyl chloride were heated with agitation to 120° C. After the termination of the reaction, 100 ml. water were added, and the mixture held at 80° C. for 2 hours. Then the pH of the solution was adjusted to 7 by addition of 40 percent aqueous NaOH solution, the salt crystallizing thereby filtered off by suction and dried. The yield was 169 g. salt or 71.5 percent of the theory, calculated on the phosphorus employed.

Example 3

1 mol phosphorous acid was mixed with 1.5 mols acetyl chloride, heated slowly to 120° C., and held at this temperature for one hour. The amorphous reaction product which did not crystallize contained less than 0.15% phosphorous acid. 100 ml. water were added thereto, and the mixture heated at 100° C. for 2 hours. The aqueous solution then was concentrated to 130 g. Upon cooling of this solution, 101 g. acid having 1 mol crystal water crystallized. The yield was 90% of the theory, calculated on the phosphorus employed (atomic ratio $C:P=1.02:1$).

Example 4

1 mol phosphorous acid was mixed with 0.4 mol acetic anhydride and 0.8 mol acetyl chloride, and agitated at 110° C. for 1.5 hours. The reaction mixture, containing less than 0.15% phosphorous acid, was cooled to 100° C., and 50 ml. water added. By introducing steam into this mixture, the same then was held at 120° C. for 1.5 hours. After this hydrolysis, the aqueous solution was adjusted to a pH of 10 by adding concentrated ammonia, whereby the ammonium salt crystallized. The yield was 82%, calculated on the phosphorus employed.

Example 5

1 mol phosphorous acid was mixed with 1.1 mols acetic acid anhydride and then heated for 1 hour at 100° C. with agitation. Into the syrupy reaction mixture, containing less than 0.1% phosphorous acid, water was condensed by introducing steam and the temperature of the aqueous mixture was held at 140° C. for 1½ hours by continuously introducing steam. After this treatment, the acid crystallized upon cooling. The yield was 102 g. acid containing water of crystallization, i.e., 91 percent of the theory, calculated on the phosphorus entered (atomic ratio of carbon to phosphorus 1:1.01).

Example 6

1 mol phosphorous acid was refluxed with 1.5 mols acetyl chloride, and the temperature then was raised to 120° C. while distilling acetyl chloride. The completion of the reaction was determined by titration of phosphorous acid. The reaction product then was treated as described in Example 5. The yield, calculated on the amount of phosphorus employed, was 92 percent of the theory (atomic ratio of carbon to phosphorus 1:1.005).

Example 7

1 mol phosphorous acid was heated with 1.2 mols acetic anhydride for 5 hours at 120° C. with agitation. The reaction mixture thereafter contained less than 0.1% phosphorous acid and consisted of several organic phosphorus compounds. It was mixed with an equal quanity of water. After heating in a closed vessel for 10 minutes at 160° C., the reaction mixture had coverted to a uniform compound of the formula $$CH_3 \cdot C(OH) \cdot [P(O)(OH)_2]_2$$

The conversion and uniformity were established paperchromatographically and by spectrometrical measurement of the nuclear magnetic resonance (N.M.R.). The yield, calculated on the original phosphorus content, was substantially quantitative. The solution was concentrated and freed from excess acetic acid by evaporation to dryness. When the temperature thereby was increased to 140° C., the solution crystallized completely without leaving a mother liquor.

Example 8

3 mols acetic acid were mixed with one mol $PCl_3$, and the mixture forming thereby, consisting of phosphorous acid and acetyl chloride, slowly heated to 120° C., whereby a part of the excess acetyl chloride distilled. The temperature of 120° was maintained for 1 hour. The product thus obtained contained less than 0.15% phosphorous acid and did not crystallize. 100 ml. water were added, and this mixture heated for 5 minutes at 180° C. in a closed vessel. The mixture of several organic phosphorus compounds, present prior to the hydrolysis, thereby converted to a uniform compound of the formula $CH_3 \cdot C(OH) \cdot [P(O)(OH_2)]_2$. Conversion and uniformity were identified by means of paperchromatography and N.M.R. spectrometry. The yield, calculated on the orginal phosphorus content, was more than 95%. The excess acetic acid was removed in vacuo. The remaining solution was made up to a 60% concentration by addition of water and was used as such for the manufacture of aqueous cleansing compounds. This additive to the cleansing solutions prevented precipitation of hardness formers in the water.

Example 9

1 mol phosphorous acid and 1.1 mols acetic anhydride were agitated at 120° C. for 3 hours. The reaction mixture then contained less than 0.2% phosphorous acid. 300 ml. water then were added, and the mixture heated in a closed vessel to 200° C. Within less than 5 minutes, i.e., after approximately 4 minutes, the previous mix of several phosphorus-containing substances had converted into a uniform compound. The conversion and uniformity were established paperchromatographically. The solution was freed from acetic acid by vacuum distillation and evaporation to a concentration of 75%. Upon further concentration, the substance crystallized entirely. A solution of 75% was used as stabilizer of soap cakes and for the prevention of the formation of calcium soaps.

Example 10

90% pure technical phosphorous acid was used. This technical acid was a waste product obtained in the chlorination of oleic acid, and, prior to the present use, had been freed from the gross of its organic impurities by extraction with benzene. 90.2 kg. of that acid were heated with 112 kg. acetic anhydride to 100° C. with agitation, and held at that temperature for an hour with continued agitation. After this time the reaction mixture contained less than 0.2% phosphorous acid. Thereafter, 10 kg. water were entered in the reaction mixture which then was treated with steam for 2 hours, whereby the temperature was held so that only little water remained in the reactor. The acid which still could be pumped, was then neutralized in a mixing nozzle with 50 percent aqueous sodium hydroxide. After cooling, the product had solidified and was comminuted by milling. The alkali salt thus obtained was stable in storage and nonhygroscopic. A 1 percent aqueous solution had a pH of approximately 7. The yield was 182 kg. salt or 96.8 percent of the theory, calculated on the phosphorus entered.

Example 11

A like mixture was prepared as in the preceding example. After termination of the hydrolysis, the solution was diluted with water to a content of 60% 1-hydroxyethane-1,1-diphosphonic acid. The acid solution thus obtained was stable and odorless and was employed for the manufacture of a liquid cleansing concentrate of the following composition:

|  | Parts |
| --- | --- |
| Acid solution obtained | 60 |
| Dodecylbenzenesulfonate | 3 |
| Adduct of 10 mols ethylene oxide on coconut fat alcohol | 4.5 |
| Water | 32.5 |
|  | 100.0 |

In a dilution with water of 1:4 to 1:5, this cleanser was very effective for the cleaning of railroad car chassis, especially for the removal of brake dust. White iron phosphate layers, frequently forming upon cleaning with materials containing orthophosphoric acid, were not observed with the cleanser of the above composition. When, in lieu of the pure acid solution according to the invention, the reaction mixture prior to hydrolysis was used, the cleanser was less suitable and, upon spraying, a very disagreeable odor was noticed.

Example 12

A mixture was prepared as described in Example 7. After the termination of the steam treatment, the aqueous acid solution was allowed to flow together with concentrated NaOH solution. The quantity was measured so that a 40 percent solution of the sodium salt formed. The pH value of that solution was 11. The stable solution was spray dried to a stable solid product.

Example 13

1 mol phosphorous acid was heated with 1.1 mols acetic anhydride at 100° C. for 1 hour with agitation. The completion of the reaction was determined by titration of phosphorous acid. The reaction mixture contained less than 0.1% phosphorous acid. Thereafter water was condensed into the reaction mixture by introducing steam and the temperature then raised to 140° C. within 1½ hours by continuously introducing steam. Following the hydrolysis, the acid solution was adjusted to a pH of 10 with concentrated ammonia, whereby the ammonium salt precipitated as crystals. The yield, calculated on the phosphorus, was 91 percent. Analytical values: C, 7.15%; P, 16.27%.

Example 14

1 mol phosphorous acid was refluxed with 1.5 mols acetyl chloride, and the temperature slowly raised to 120° C. Into the reaction mixture, containing less than 0.15% phosphorous acid, water was condensed by introducing steam and the temperature then raised to 140° C. within 1.2 hours. The acid solution was adjusted to a pH of 10 by addition of concentrated aqueous potassium hydroxide solution. The potassium salt thus formed was precipitated by addition of methanol. The yield was 160 g. or 85 percent of the theory, calculated on the phosphorus.

Example 15

2 mols phosphorous acid were heated at 110° C. for 2 hours with a mixture of 1.6 mols acetic anhydride and 0.8 mol acetyl chloride. The completion of the reaction was determined by titration of phosphorous acid. 100 ml. water then were added to the reaction mixture at 80° C., and the temperature of the aqueous solution was raised to 110° C. by the introduction of steam within 2.5 hours. The aqueous solution then was adjusted to a pH of 9 by addition of triethanolamine, then was spray-dried to a stable crystalline product.

In lieu of triethanolamine any other alkanolamine can equally well be used.

Example 16

850 grams (g.) propionic acid anhydride and 412.5 g. phosphorous acid were mixed and heated for 2.5 hours at 120° C. The completion of the reaction was determined by titration of phosphorous acid. A viscous syrup formed under a supernatant liquid. The latter was decanted, and into the lower layer water was condensed by introducing steam and the temperature was held at 120° C. for 1 hour by continuously introducing steam. The pH then was adjusted to 12 with 40 percent aqueous NaOH. Upon addition of a little methanol, the sodium salt immediately crystallized. The yield was 74 percent of the theory, calculated on the phosphorus present. (Analytical values found: C, 9.15%; P, 15.66%.)

Example 17

0.5 mol phosphorous acid were stirred with 0.63 mol butyric acid anhydride for 10 hours at 120° C. The reaction product then contained less than 0.15% phosphorous acid. Into the reaction mixture water was condensed by introducing steam and the temperature raised to 130° C. This temperature was maintained for 1½ hours by continuously introducing steam. Following the hydrolysis, the acid solution was neutralized to a pH of 7 with 50% aqueous NaOH. Upon addition of a little ethanol, the sodium salt precipitated in crystalline form. The yield was 72 percent of the theory, calculated on the phosphorus. Analytical values of C, 13.44%; P, 17.11%.

Example 18

1 mol phophorous acid was mixed with 1.5 mols caproic acid chloride and heated with agitation for 3 hours at 140° C. The completion of the reaction was determined by titration of phosphorous acid. Thereafter water was condensed into the reaction mixture by introducing steam and the temperature raised to 140° C. within 2 hours by continuously introducing steam. After neutralization with 40% NaOH and upon addition of a little methanol, the sodium salt crystallized. The yield was 82.5 percent of the theory, calculated on the phosphorus. Analytical values: C, 24.0%; P, 17.05%.

Example 19

1 mol $PCl_3$ was added to a mixture of 1.5 mols caproic acid with 1.5 mols water. The reaction mixture of phosphorous acid and caproic acid chloride thus forming was heated at 140° C. for 3 hours whereby practically all phosphorous acid had reacted. The reaction mixture then was treated with steam at 160° C. After 20 minutes, all excess caproic acid had distilled, and a uniform compound remained, consisting of 1-hydroxyhexane-1,1-diphosphonic acid, in a yield of 96%, calculated on the phosphorus originally present. A 55% aqueous solution then was produced which was eminently suited as complex former with iron and copper ions and for the prevention of calcite precipitation.

Example 20

1 mol phosphorous acid was mixed with 1.4 mols caproic acid chloride and agitated at 160° C. for 5 hours. The completion of the reaction was determined by titration of the phosphorous acid. 100 ml. water were added to the reaction mixture at 100° C., and the temperature then raised to 140° C. by introducing steam therein. This temperature was maintained for 4 hours. By neutralization with 40% NaOH, the sodium salt was precipitated in crystalline form which was suction-filtered and dried. The yield was 85% of the theory, calculated on the phosphorus employed.

In Examples 3, 6, 14, 18 and 20, it is feasible to use, in lieu of phosphorous acid and acid chlorides, the corresponding quantities of $PCl_3$ and carboxylic acid because the formation of phosphorous acid and carboxylic acid chloride is practically instantaneous. Under certain conditions, a portion of the stoichiometrically required carboxylic acid for the hydrolysis of PCl₃ may be replaced by water.

We claim:
1. In a process for the manufacture of products having the formula

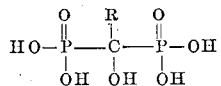

wherein R is an alkyl having 1 to 11 carbon atoms, by the reaction of phosphorous acid with substances selected from the group consisting of aliphatic carboxylic acid anhydrides, aliphatic carboxylic acid chlorides, and mixtures thereof, having 2 to 12 carbon atoms in their molecules at temperatures of from 80° to 200° C. until the reaction is terminated, the improvements which consists of obtaining substantially pure, uniform and crystallizable products by subjecting the reaction mixture, after completion of the reaction, to a hydrolysis with water at a temperature above 60° C. for a time sufficient to hydrolyze said mixtures to said pure product.

2. A process for the manufacture of substantially pure, uniform, crystallizable products having the formula

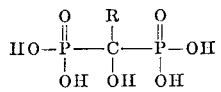

wherein R is an alkyl having 1 to 11 carbon atoms, which consists essentially of the steps of reacting phosphorous acid with substances selected from the group consisting of aliphatic carboxylic acid chlorides, aliphatic carboxylic acid anhydrides and mixtures thereof, having 2 to 12 carbon atoms in their molecules, at temperatures of from 80° C. to 200° C. until the reaction is terminated; hydrolyzing the mixture thus obtained by the action of water at temperatures above 60° C. for a time sufficient to hydrolyze said mixture to said product.

3. The process as defined in any one of claims 1 and 2, wherein said hydrolization product is neutralized with a base selected from the group consisting of an alkali metal base, an ammonium base and an alkanolamine base.

4. The process as defined in any one of claims 1 and 2, wherein as starting materials, PCl₃ and the corresponding aliphatic carboxylic acids having 2 to 12 carbon atoms in their molecules are used in substantially stoichiometrical amounts, which together react to form said phosphorous acid and said aliphatic carboxylic acid chloride.

5. The process as defined in any one of claims 1 and 2, wherein the molar proportions of said phosphorous acid to said substance are 1:1.1 to 1:1.5.

6. The process as defined in any one of claims 1 and 2, wherein said hydrolyzation product is crystallized.

7. The process as defined in any one of claims 1 and 2, wherein said hydrolyzation is carried out at temperatures of 60–200° C. within substantially 4 minutes to 6 hours.

8. The process as defined in any one of claims 1 and 2, wherein said hydrolyzation is carried out with steam.

9. The process as defined in any one of claims 1 and 2, wherein said hydrolyzation is carried out at atmospheric pressure.

10. The process as defined in any one of claims 1 and 2, wherein said hydrolyzation is carried out in a closed reaction zone at ambient pressures.

References Cited

UNITED STATES PATENTS

| | | | |
|---|---|---|---|
| 3,122,417 | 2/1964 | Blaser et al. | 260—502.4 |
| 3,149,151 | 9/1964 | Schiefer et al. | 260—502.4 |
| 3,214,454 | 10/1965 | Blaser et al. | 260—502.4 |

FOREIGN PATENTS

| | | |
|---|---|---|
| 1,148,551 | 5/1963 | Germany. |
| 978,297 | 12/1964 | Great Britain. |

OTHER REFERENCES

Brooks, "J. Am. Chem. Soc." vol. 34 (1912), pp. 492–9.

LEON ZITVER, Primary Examiner

J. E. EVANS, Assistant Examiner

U.S. Cl. X.R.

23—165; 210—57; 252—89, 108, 142; 260—438, 439, 502.4, 541, 544